(12) United States Patent
Kogan et al.

(10) Patent No.: US 8,561,052 B2
(45) Date of Patent: Oct. 15, 2013

(54) COMMUNICATIONS DEVICE WITH A PLURALITY OF PROCESSORS AND COMPATIBILITY SYNCHRONIZATION MODULE FOR PROCESSOR UPGRADES AND RELATED METHOD

(75) Inventors: Eugene Kogan, Rochester, NY (US); Shawn Ellis, Farmington, NY (US); Mike Hubbard, Williamson, NY (US)

(73) Assignee: Harris Corporation, Melbourne, FL (US)

( * ) Notice: Subject to any disclaimer, the term of this patent is extended or adjusted under 35 U.S.C. 154(b) by 1332 days.

(21) Appl. No.: 12/329,840

(22) Filed: Dec. 8, 2008

(65) Prior Publication Data

US 2010/0146497 A1 Jun. 10, 2010

(51) Int. Cl.
*G06F 3/00* (2006.01)
*G06F 9/44* (2006.01)

(52) U.S. Cl.
USPC .......................................... 717/170; 719/331

(58) Field of Classification Search
USPC ........................................................ 717/170
See application file for complete search history.

(56) References Cited

U.S. PATENT DOCUMENTS

| | | | |
|---|---|---|---|
| 4,530,051 A | 7/1985 | Johnson et al. | 364/200 |
| 4,539,637 A | 9/1985 | DeBruler | 364/200 |
| 4,751,702 A | 6/1988 | Beier et al. | 371/9 |
| 4,817,091 A | 3/1989 | Katzman et al. | 371/9 |
| 4,875,159 A * | 10/1989 | Cary et al. | 1/1 |
| 5,280,612 A * | 1/1994 | Lorie et al. | 1/1 |
| 5,577,231 A | 11/1996 | Scalzi et al. | 395/500 |
| 6,449,764 B1 * | 9/2002 | Sliger et al. | 717/170 |
| 6,938,109 B1 * | 8/2005 | Sliger et al. | 710/68 |
| 2002/0065958 A1 * | 5/2002 | Rocray et al. | 709/331 |
| 2003/0100297 A1 * | 5/2003 | Riordan et al. | 455/418 |
| 2004/0045001 A1 * | 3/2004 | Bryant | 718/100 |
| 2004/0061726 A1 * | 4/2004 | Dunn et al. | 345/855 |
| 2005/0108382 A1 * | 5/2005 | Murotake et al. | 709/223 |
| 2006/0117212 A1 * | 6/2006 | Meyer et al. | 714/4 |
| 2008/0012839 A1 * | 1/2008 | Feague et al. | 345/179 |
| 2011/0023106 A1 * | 1/2011 | Murotake et al. | 726/11 |

\* cited by examiner

*Primary Examiner* — Li B Zhen
*Assistant Examiner* — Arshia S Kia
(74) *Attorney, Agent, or Firm* — Allen, Dyer, Doppelt, Milbrath & Gilchrist, P.A.

(57) ABSTRACT

A multiprocessor device includes a plurality of device subsystems each having a processor dependent on a respective other processor in another device subsystem for device operation. Each processor has at least one independent channel for updating a respective software version within the respective processor. A compatibility synchronization module has a database storing a table of compatible software versions for each processor. It is updated when a new software version for a processor is created. This table is independent of software images for the software versions. The compatibility synchronization module is operative for verifying if the software version for a processor is compatible with other software versions at other processors and instructs a respective device subsystem to revert back to a compatible software version within a respective processor or prevent any incompatible software updates within the processor.

24 Claims, 10 Drawing Sheets

COMMUNICATIONS DEVICE WITH A PLURALITY OF PROCESSORS AND COMPATIBILITY SYNCHRONIZATION MODULE FOR PROCESSOR UPGRADES AND RELATED METHOD

FIELD OF THE INVENTION

The present invention relates to synchronizing multiple processors, including FPGA's, server farms, PC clusters, microclusters and similar processors, and more particularly, the present invention relates to a communications device with field upgrade capabilities in a plurality of independent processors that are dependent on each other and verifying software versions for the processors

BACKGROUND OF THE INVENTION

Many communications devices, such as software-defined radios or similar electronic devices, include at least two processors each with their own binaries that are dependent on each other. These multiple processors exchange data and communicate with each other and depend on each other to operate the device. Each processor typically has its own independent channels to update the software to a specific or desired software version. For example, in a software-defined radio (SDR), analog signals are converted into the digital domain where the different functions of frequency generation, modulation, bandwidth, security and waveform requirements are performed by software modules or components in the software-defined radio. Analog signals are converted into the digital domain where these functions are performed using digital signal processing.

One class of software-defined radio that takes advantage of these above-described advantages and features is the Joint Tactical Radio (JTR). This type of radio system usually has at least two processors that are used for red and black side radio subsystems. Independent channels are operative at each processor for each subsystem and used to update the software to a specific software version. For example, the radio can be upgraded to a new software version in the field such as using over-the-air (OTA) updates. Updating the software independently within each processor with new software versions, however, can make the software in one of the processors incompatible with another software version contained in the other processor. In this situation, the red subsystem processor in a software-defined radio would be incompatible with the black subsystem processor that is to be upgraded or has already been updated and this incompatibility could create problems during radio operation.

Because of these possible errors in upgrading the software versions in different processors as part of different device or radio subsystems, for example, if there is accidental upgrade to incompatible versions, forced procedures for upgrade techniques and trained personnel are typically required to upgrade the software versions. When incompatible software versions exist, these trained personnel must repair the radio as necessary, making any software version upgrade expensive and time consuming Upgrading software versions may even require a trained technician taking the radio apart to perform the software upgrade. It is desirable if the programming of the two or more processors with an independent binary or software solution such as in a software-defined radio or similar electronic device with multiple processors in subsystems could be linked, for example, linking red and black processors in a Joint Tactical Radio that conforms with the Software Communications Architecture (SCA) of the Joint Tactical Radio System (JTRS) such that software version upgrades leading the incompatible versions could be avoided.

SUMMARY OF THE INVENTION

A multiprocessor device includes a plurality of device subsystems each having a processor dependent on a respective other processor in another device subsystem for device operation. Each processor has at least one independent channel for updating a respective software version within the respective processor. A compatibility synchronization module has a database storing a table of compatible software versions for each processor. It is updated when a new software version for a processor is created. This table is independent of software images for the software versions. The compatibility synchronization module is operative for verifying if the software version for a processor is compatible with other software versions at other processors and instructs a respective device subsystem to revert back to a compatible software version within a respective processor or prevent any incompatible software updates within the processor.

The compatibility synchronization module, in one aspect, is located within one of the processors and in another aspect is located external to the processor. A user interface can be provided through which a user interfaces with the device subsystems. The compatibility synchronization module is operative for determining when a new software version within the processor is incompatible. In response, it can send a warning message to the user interface indicating that the software version in the respective processor is incompatible. In response to the warning message, software containing the new software version is disregarded or allowed to update based on user action through the user interface.

Each processor is also operative for reverting back to a previous software version that is compatible upon device shutdown after the compatibility synchronization module determines that a processor has a software version that is incompatible. Each processor can revert back to a previous software version by signaling a processor to revert. A data storage can be operative with the respective processor in which previous software versions that are compatible are stored to which a respective processor can revert back to when the synchronization compatibility module determines that a software version of a processor is compatible.

The multiprocessor device, in one aspect, could be a software-defined radio having a radio circuit with multiple radio subsystems each having a processor that is dependent on a respective other processor in another radio subsystem for radio circuit operation. Each processor has at least one independent channel for updating a respective software version within the processor. An executable radio software system is operable with the radio circuit and multiple radio subsystems and conforms to the software communications architecture (SCA) specification and defines an operating environment that allows a waveform application to operate with a radio circuit for transmitting and receiving voice and data.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Figure 1:
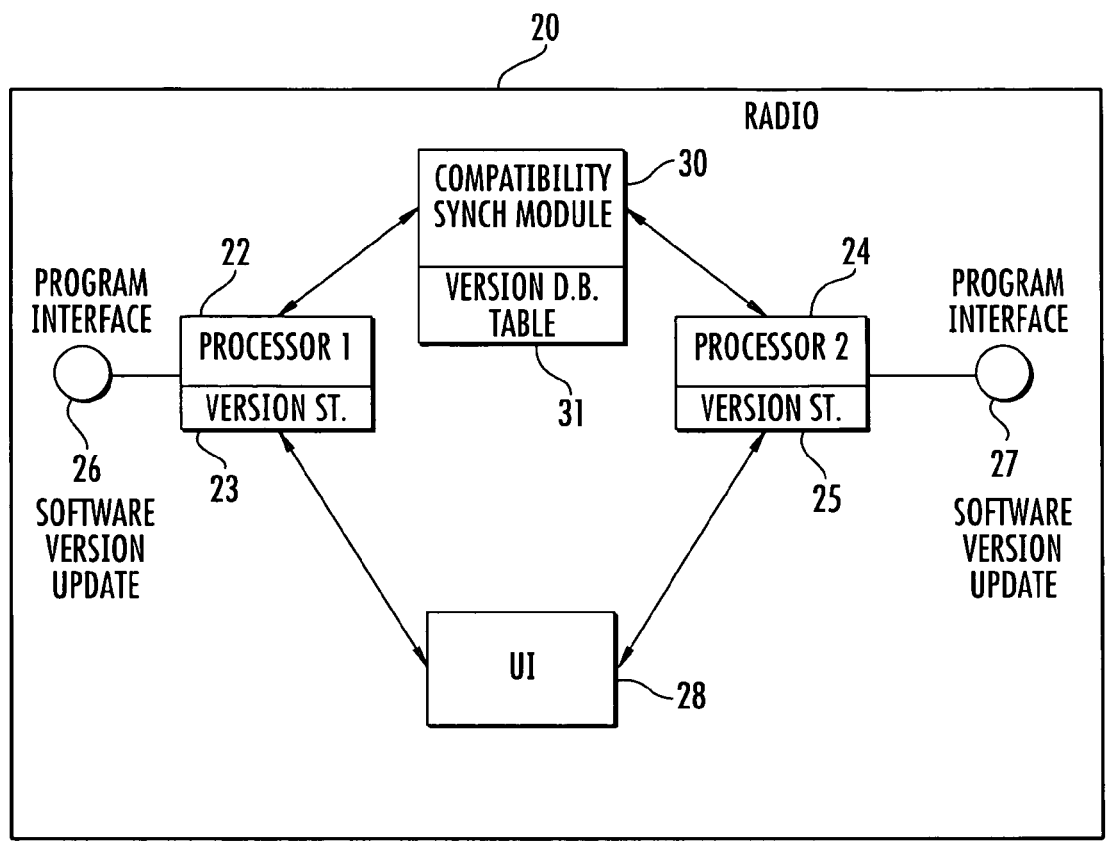
FIG. 1 is a block diagram of an example device having two processors, for example, the red and black processors as part of separate subsystems (for example, in a software-defined radio) and showing the compatibility synchronization module operable with the two processors in accordance with a non-limiting example.

FIG. 1 is an example communications device 20 with first and second processors 22, 24, such as a software-defined radio, which in this example is operable in accordance with the Software Communications Architecture (SCA). As illustrated, it includes the two processors 22, 24 as typically part of a red and black subsystem in the software-defined radio and each having a program interface 26, 27. The program interface 26, 27 allows each processor 22, 24 to be upgraded to a desired software version. The radio includes a user interface 28 that typically is totally independent. The compatibility synchronization module 30 could be located on one of the processors or located separate from the processors as illustrated and include its own software version database 31 having a software version table in a non-limiting example. Programming of the processors 22, 24 can occur through over-the-air (OTA) programming using the file transfer protocol (FTP) as a non-limiting example and through the respective program interfaces into which software images or data for a respective software version upgrade is channeled. The compatibility synchronization module 30 could be a software component and programmed within one of the processors, which could be formed as a digital signal processor (DSP) or Field Programmable Gate Arrays (FPGA). The compatibility synchronization module includes the table 31 that is first updated when different processor versions are to be updated. The table of compatible software versions are stored in the compatibility synchronization module database 31 and every time a new software version is created, the table is updated. Each processor 22, 24 has primary and back-up versions of the software image contained in respective storage 23, 25. The table 31 as part of the module 30 as stored is independent of the software images. It should be understood that two or more processors as a plurality of processors can be included and the system and methodology as described is operable with multiple processor and device subsystems.

Thus, as shown in FIG. 1, the interconnected communication system has the first and second processors 22, 24 and each having field upgrade capabilities for updating each processor with a respective software version upgrade. The two or more independent processors 22, 24 as shown in FIG. 1 have separate resources and independent programming capabilities. One of the processors could contain the compatibility synchronization module or the module could be separate from the processors as illustrated in FIG. 1 and noted before.

The compatibility synchronization module 30 has configurable information about a compatible software version for each interconnected processor 22, 24. When one of the processor's software version is updated, the compatibility synchronization module 30 checks if the software version is compatible and, in one non-limiting example, either rolls back the software version upgrade to a previous software version or prevents any software version upgrades.

The system is operable with different use cases and could operate with different FPGA's, server farms, PC clusters, microclusters and different processors. One use case is checking at software version upgrade. When a new software version is received, that version is checked in the compatibility synchronization module. If the new software version is incompatible with the current software version on the other processor (or multiple other processors), a warning message will be sent to the user interface such as part of the display on the software-defined radio or an audible alarm can sound. Depending on the user action, the system can proceed with the software version upgrade programming or disregard the received a file of that particular software version upgrade. This could be advantageous in some situations when over-the-air programming is used for upgrading the software version, for example.

In another use case, software version checking can occur at boot up. The radio does not conduct any checks on the received files. It programs the software images and when the radio is re-powered, it checks if both processors have software versions that are compatible and reverts to back-up copies if the versions are not compatible.

In yet another use case, the device system can check software versions at shut down. If some programs with software versions are not compatible, the processor can revert to a previous software version stored as a back-up. These different use cases as described can be mixed and matched.

When the compatibility synchronization module 30 is upgraded or loaded with new software versions, it maintains the old database information and knows at any time the compatible software versions and what software versions are and are not compatible.

The use of the compatibility synchronization module 30 in this operating environment has several advantages. It prevents radio malfunctioning after programming and prevents operator mistakes during programming. It reduces the cost of reprogramming the radio, which otherwise without the compatibility synchronization module, might need to be disassembled to program each processor with a new software version independently. The process allows a graceful platform recovery.

Programming for the compatibility synchronization module and multiple processors can occur in different circuits corresponding to a processor, such as Field Programmable Gate Array (FPGA) or digital signal processor (DSP) as non-limiting examples. VHDL (VHSIC hardware description language) can be used for the different processors or Field Programmable Gate Arrays and Application-Specific Integrated Circuits. VHDL is typically used as a design-entry language and programming accomplished in the C language (or similar languages). Different entities could be used as a design to describe an interface in the architecture with different configurations. Mux templates, latch templates, different types of flip flops, counters and different constructs can be used with different register transfer levels.

Figure 2:
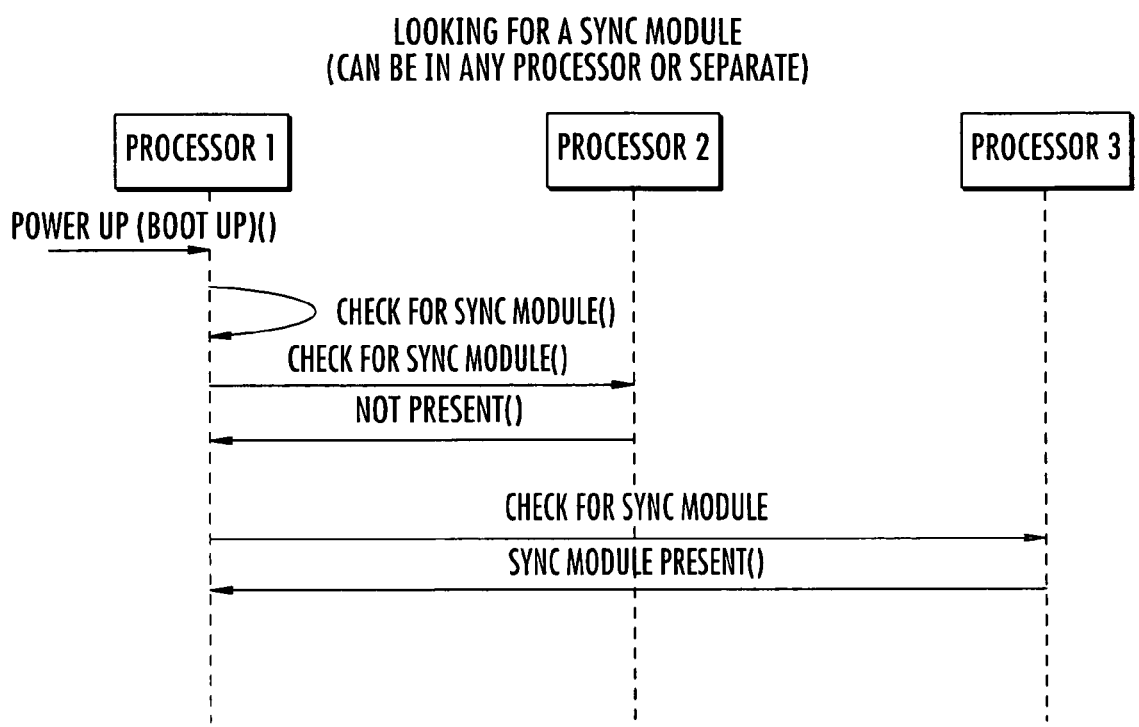
FIG. 2 is a diagram showing an example of a sequence of steps at the power up (boot up) and the system looking for the compatibility synchronization module that can be located in any of the processors or separate and external to any of the processors in accordance with a non-limiting example.

Referring now to FIG. 2, a process (or flow sequence) is shown that occurs when the system, such as part of a radio device, looks for the compatibility synchronization module such as at power up or boot up. It should be understood that the compatibility synchronization module can be located in any of the processors as indicated for processor 1, processor 2 or processor 3 or the module could be separately located external to the processors within the radio and not part of those processors such as a software module programmed in a FPGA as the processor.

At initial power up, the system checks for the compatibility synchronization module to determine if it is located in processor 1. If it is not present, the system checks in the second processor, and if not present, the boot process continues and the system checks for the compatibility synchronization module in processor 3. In this particular example, processor 3 contains the compatibility synchronization module. If processor 3 did not contain the compatibility synchronization module, the boot (or power up) would continue until the compatibility synchronization module was located as a separate software component on another processor or within the radio (or other device) at part of another component or stand-alone module with appropriate programming.

Figure 3:
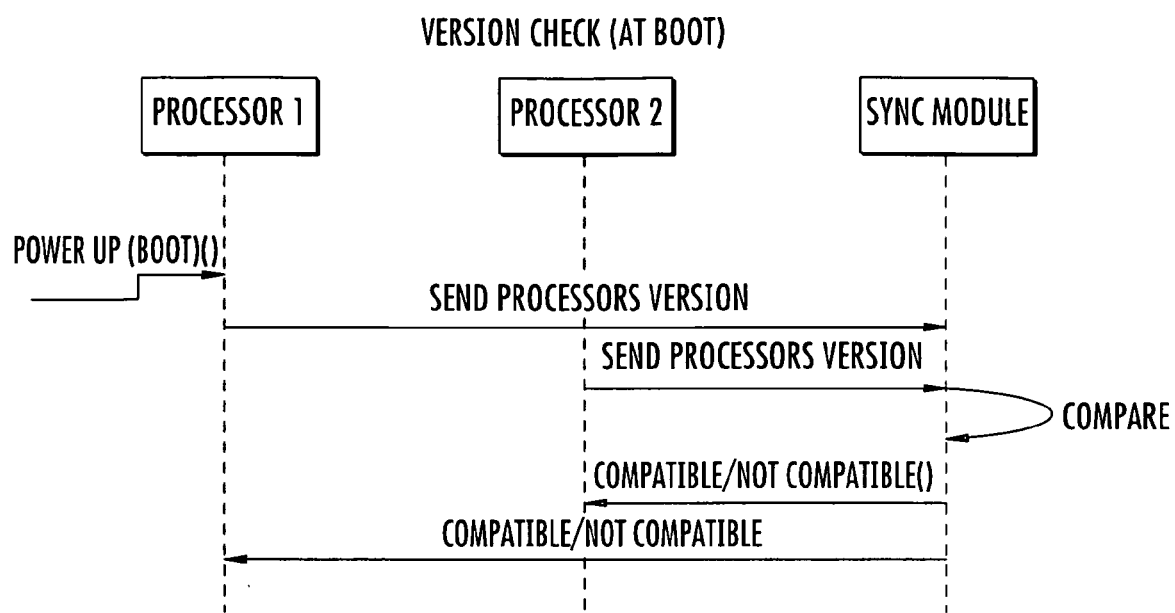
FIG. 3 is a diagram showing an example of a sequence of steps used when the system checks different software versions in multiple processors for compatibility at boot (or power up) in accordance with a non-limiting example.

FIG. 3 shows the processor sequence for a version check such as at boot in which power up occurs and processor 1 sends its processor version to the compatibility synchronization module. For example, processor 1 may have a version 1.5 software version as an upgrade and it would send that information to the compatibility synchronization module. This is followed by processor 2 sending its processor software version and a comparison accomplished by the compatibility synchronization module. After the software version comparison, the compatibility synchronization module sends back information to processor 2 that its software version is compatible or incompatible. The same occurs for processor 1 with information sent whether its software version is compatible or incompatible. If it is not compatible, the processor that is not compatible may revert back to its previous compatible software version so that there will be compatibility between software versions in the various processors. It should be understood that the compatibility synchronization module could be a ubiquitous piece of code and located almost in any processor or other component on the radio or other device having the multiple processors. It should also be understood that any processor can check to determine where the compatibility synchronization module is located. The compatibility synchronization module can also inform any processors about the state of the system, such as the operating or other functional software versions.

Figure 4:
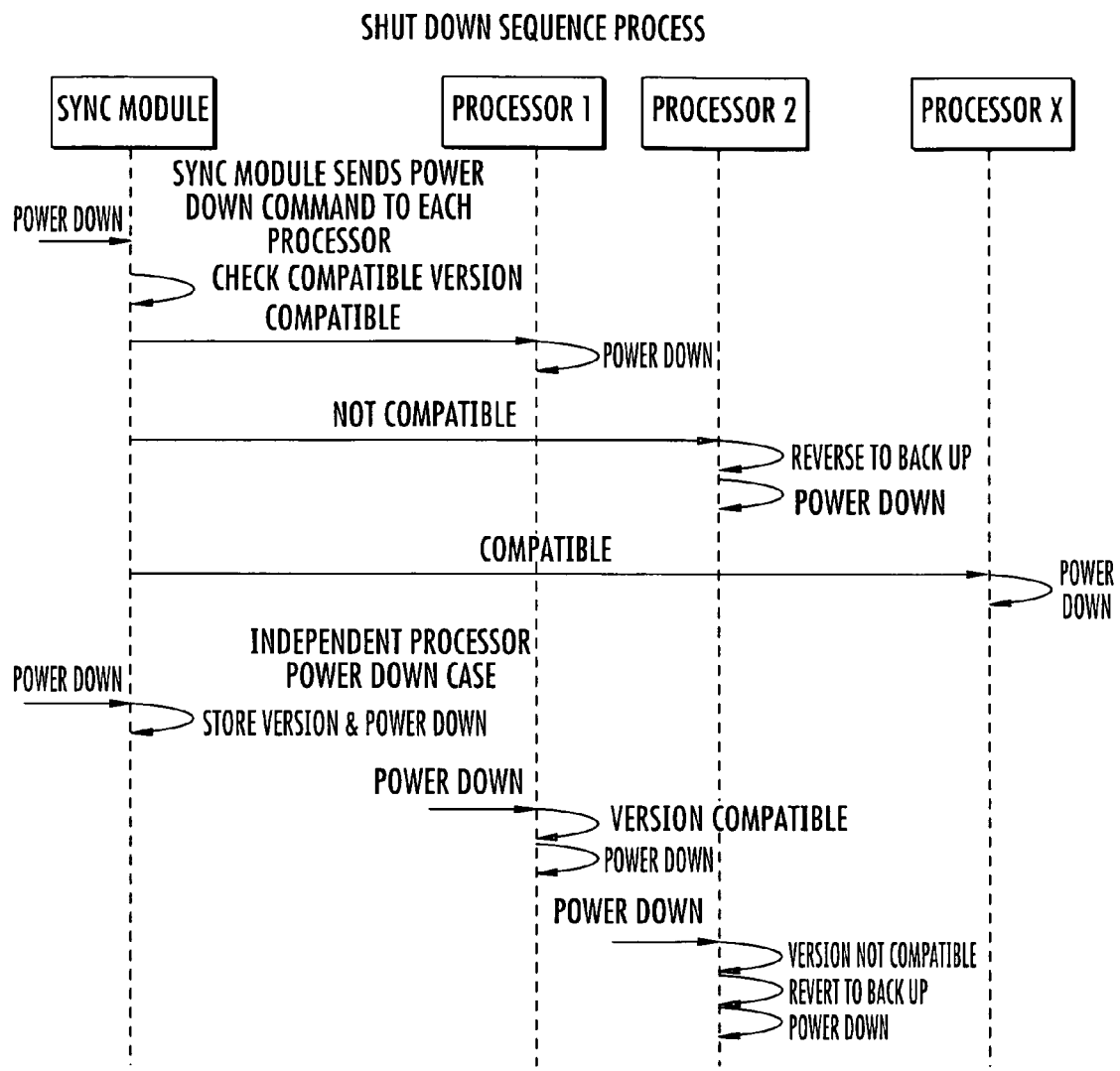
FIG. 4 is a diagram showing an example of two aspects in a shutdown sequence in which the synchronization module can send a power down command to each processor (as shown in the upper part of the diagram) or an independent processor can power down on its own (as shown in the lower part of the diagram) in accordance with a non-limiting example.

FIG. 4 illustrates a shut down sequence (process). As shown, the compatibility synchronization module is operable with processor 1, processor 2 and what is shown as processor X, indicating that there are a large number of processors in this example, i.e., more than two.

It should be understood that this multiprocessor system typically has a software-controlled shutdown. In a first aspect shown at the top portion of the diagram, the compatibility synchronization module sends a power down command to each processor. For example, a power down command could occur by the user of the radio pushing the "off" button on the radio user interface. The compatibility synchronization module would check for compatible software versions within the synchronization module and check processor 1 to determine if it is compatible, and if it is, the synchronization module would send a signal instructing to power that processor down. The compatibility synchronization module then checks processor 2 to determine if it is compatible, and if it is not, it would tell processor 2 through appropriate instructions to revert back to its compatible version such as from version 1.7 to version 1.5, back-up and then power down. Processor X may be compatible when the compatibility synchronization module checks and verifies and processor X is then shut down by command from the compatibility synchronization module in this example.

In a second aspect shown at the lower portion of FIG. 4, each independent processor can power down on its own. Each processor already knows whether it is compatible or is not compatible. For example, a specific processor may have been informed of its software version compatibility state upon initial software version upgrade in one example and whether it was compatible with version 1.5 (or version 1.7, for example). That processor stores that information. On power down, the compatibility synchronization module shuts itself down. Processor 1 would know whether it is compatible and, as illustrated, it is compatible and powers down. Processor 2, for example, may not be compatible and it reverts to a back-up software version such as version 1.5 and powers down. The process continues with each of the processors up to processor X.

It should be understood that there are a number of ways to shut down the radio or device system. When the compatibility synchronization module receives the shut down command, it can send a message to each processor to let that respective processor know if its software version is compatible or not, and therefore, that processor is required to reverse and back-up a software version. Another possible scenario is when each processor keeps the power up response as received from the compatibility synchronization module and decides what to do when it receives the shutdown command.

Figure 5:
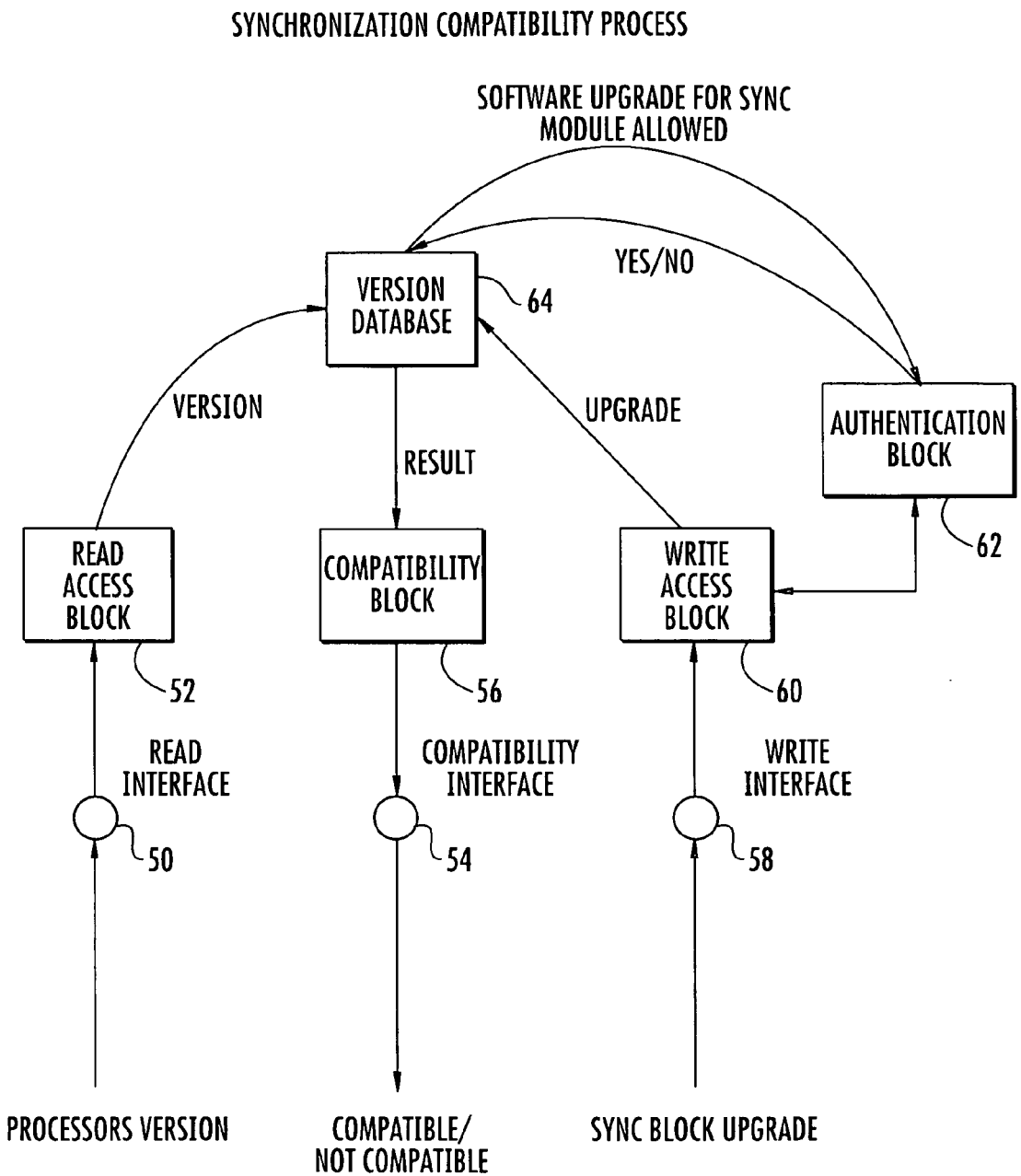
FIG. 5 is a block diagram showing the different interfaces and access blocks for a synchronization compatibility process in accordance with a non-limiting example.

FIG. 5 shows a synchronization compatibility process flow in which the various interfaces and components are shown. As illustrated, the read interface 50 is operable for the processor version and with a read access block (or module) 52. A compatibility interface 54 receives data regarding compatible/not compatible information and is associated with a compatibility block (or module) 56. A write interface 58 is operable with compatibility synchronization block upgrade information and write access block (or module) 60. An authentication block (or module) 62 and version database 64 are shown. Each of the blocks as illustrated can be separate modules or part of a larger programmed module associated with a specific processor and operable with the software version database as shown in FIG. 1.

A piece of software will have a given interface as represented by the different interfaces for the read interface 50, compatibility interface 54 and write interface 58. These are used to resolve software versions and also allow for upgrades in the compatibility synchronization module. For example, if at an initial upgrade software version 1.5 is upgraded to version 1.7, the software may be uploaded and the compatibility synchronization module upgrades by the system writing to the write interface 58.

As a non-limiting example, data can be written into the write access block 60. The authentication block or module 62 is first checked and the software upgrade for the compatibility synchronization module is authenticated and a determination made whether that is a "go" or "no go" (yes or no) as indicated. The upgraded version will be pushed into the version database and communication occurs between the write access block 60 and the authentication block or module 62 to make sure that version is acceptable to be pushed. This can occur when one of the processors is booting and it states, for example, write version 1.7 (to be pushed) into the version database. The system can also determine if a processor is valid before software versions are pushed and used to ensure the processor and software version is authentic. The processor would read its software version into the software version database and in association with the compatibility synchronization module, determine the compatibility result and output data to the compatibility block through the compatibility interface, stating whether it is compatible or not compatible. This process could be used with any number of processors. Compatibility information is typically pushed out of the compatibility interface.

Figure 6:
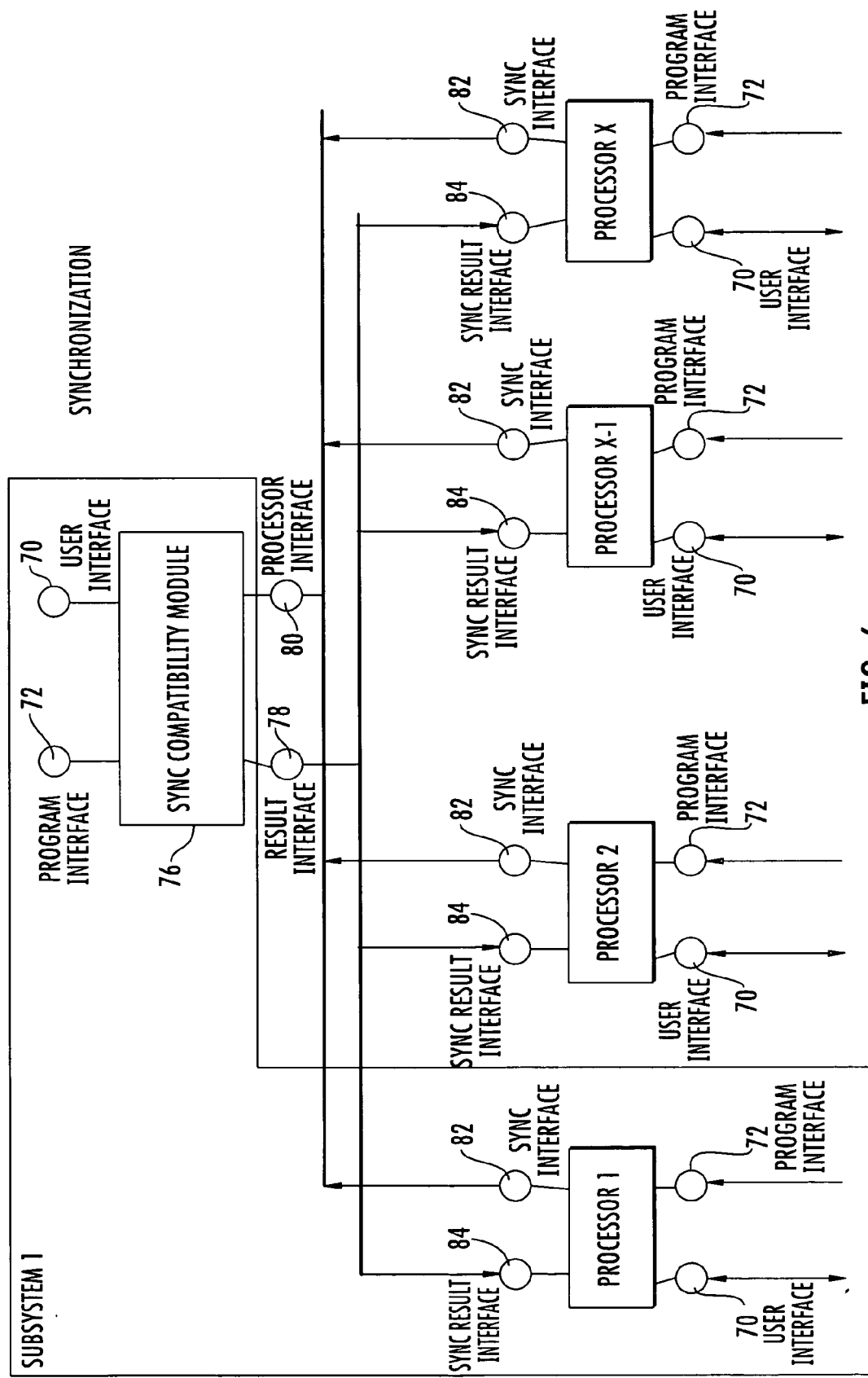
FIG. 6 is a block diagram showing a fragmentary representation of the synchronization module and various interfaces for different processors and the synchronization compatibility module in accordance with a non-limiting example.

FIG. 6 shows a synchronization block diagram as a fragmentary representation and showing the processors (processors 1, 2 X-1 and X) for the various synchronization interfaces and synchronization result interfaces. The processors each include a user interface 70 and a program interface 72. The user interface for each processor might interface information that is displayed on a radio device and a program interface allows programming and upgrades or other information. The compatibility synchronization module 76 also has a program interface 72 and user interface 70. The result interface 78 and processor interface 80 communicate with processors along the respective communications data bus using a sync interface 82 and sync result interface 84. The compatibility synchronization module 76 is shown as part of processor 1 and the subsystem 1, but it could be part of any processor or separate itself. The synchronization result interface 84 allows information transfer after synchronization occurs.

Figure 7:
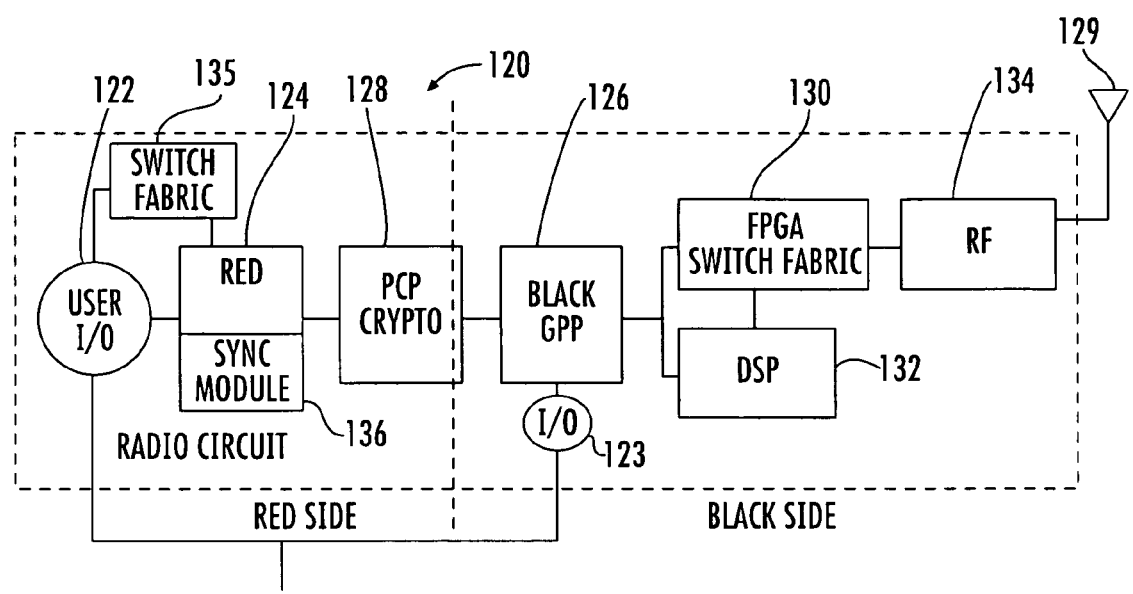
FIG. 7 is a high-level block diagram of an example of Software Communications Architecture (SCA) hardware components in a software-defined radio using two different processors that could use the synchronization module for software version upgrades in accordance with a non-limiting example.
Figure 8:
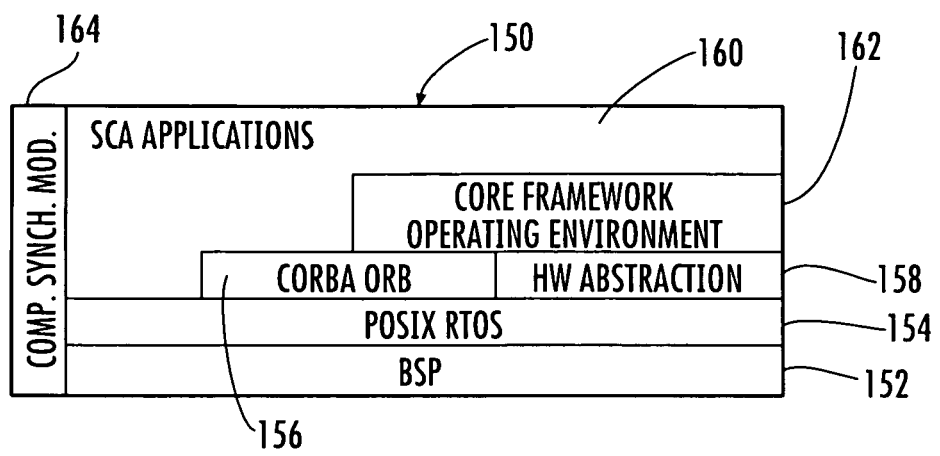
FIG. 8 is a high-level block diagram of an example of software architecture that is operable in accordance with a non-limiting example of the SCA software-defined radio shown in FIG. 7.
Figure 9:
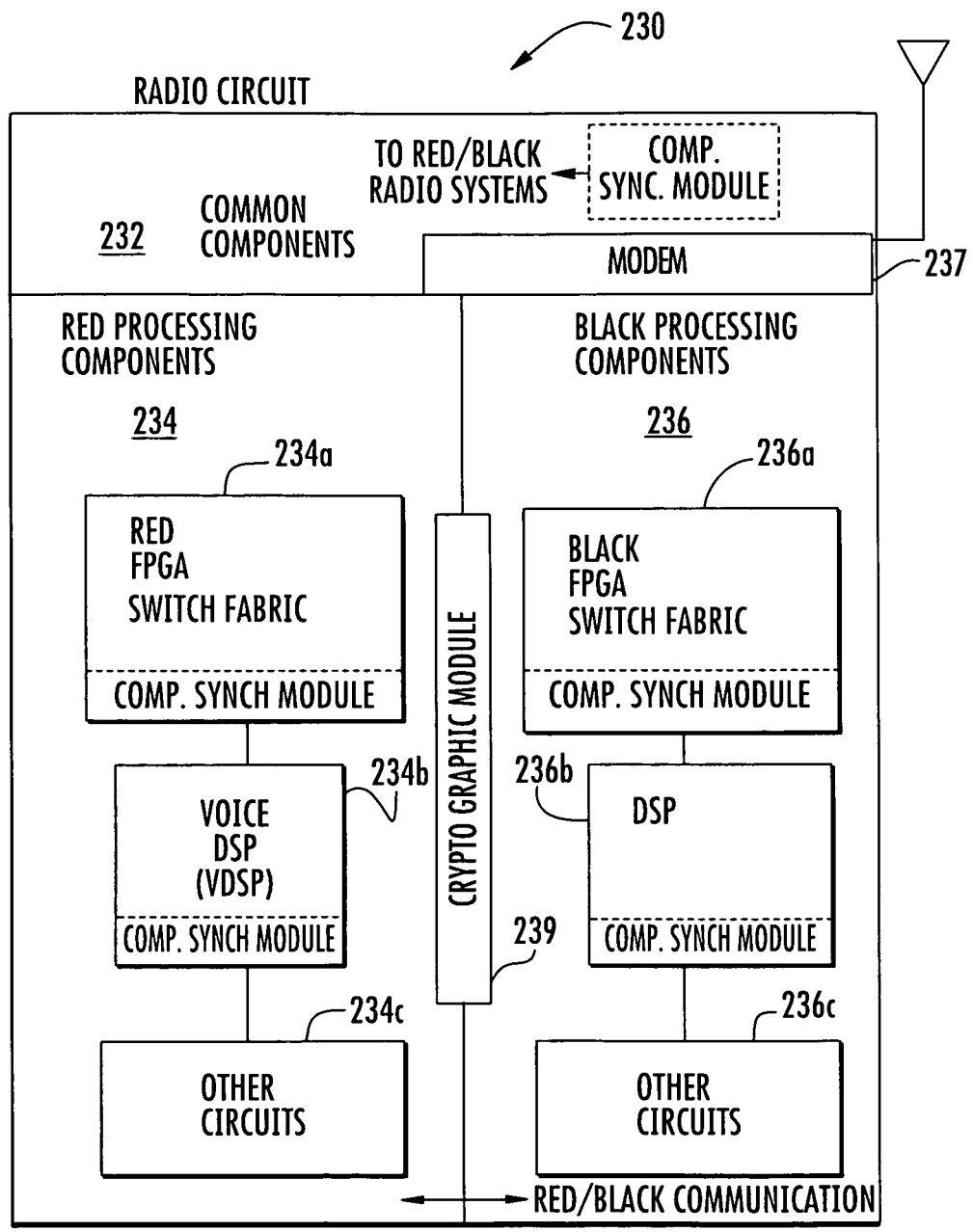
FIG. 9 is a high-level block diagram of a radio circuit used in a software-defined radio that uses the Software Communications Architecture (SCA) and showing possible locations of the synchronization compatibility module within the radio in accordance with a non-limiting example.
Figure 10:
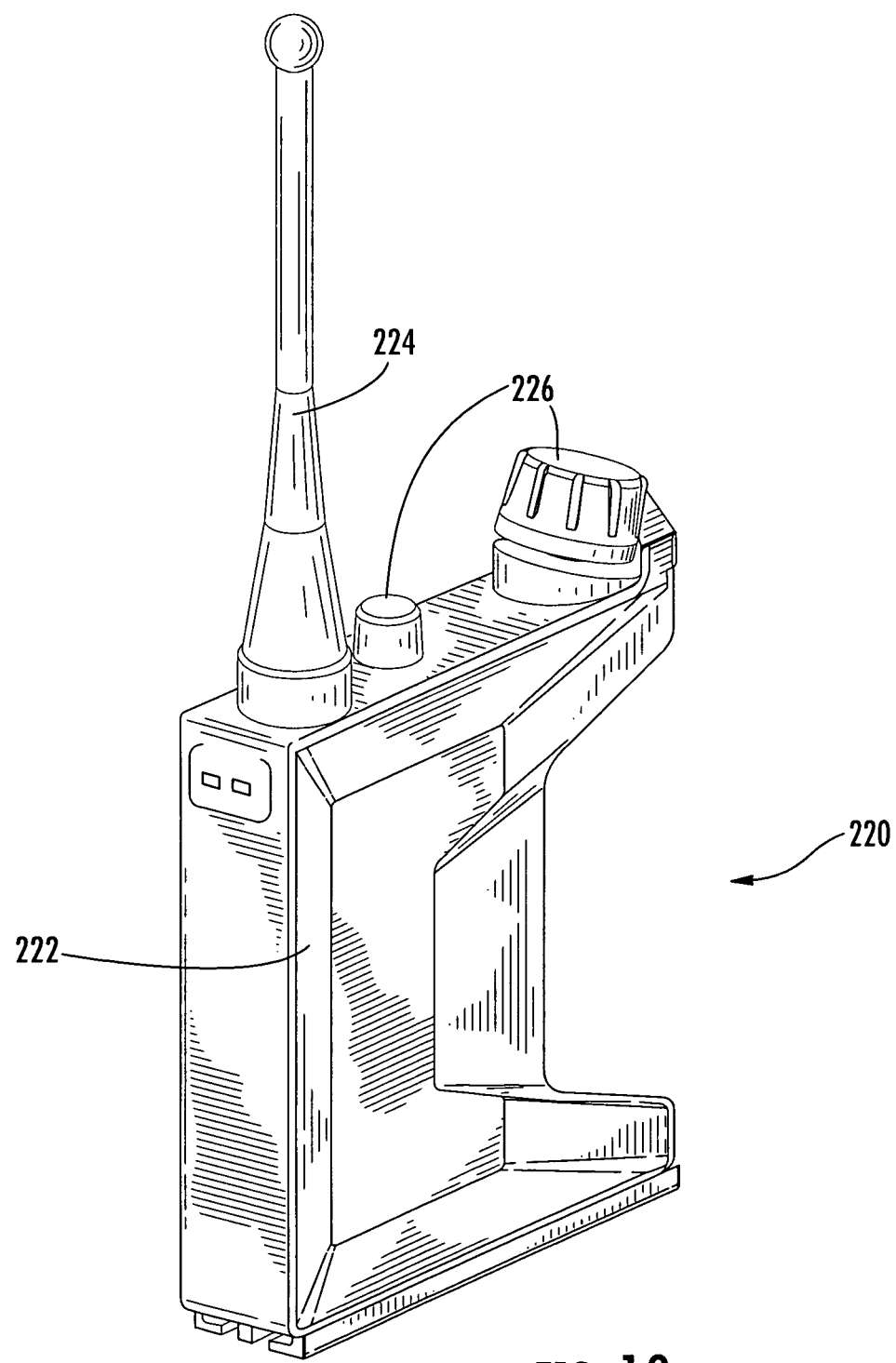
FIG. 10 is a perspective view of a portable wireless communications device as a handheld radio that can incorporate the software-defined radio and method in accordance with a non-limiting example.

FIGS. 7-9 are examples of a software-defined radio in accordance with the SCA standard that shows various positions of the compatibility synchronization module in FIG. 9 while FIG. 10 shows an example of a communications device that could be used in accordance with non-limiting examples. There now follows a basic background information regarding software-defined radios followed by greater details of the software-defined radio as shown in FIGS. 7-10 with the synchronization compatibility module in accordance with a non-limiting example.

With advances in processing capabilities and programming technologies, software-defined mobile wireless communications devices (e.g., software-defined radios) continue to increase in popularity. Rather than relying upon hardware and circuitry components to perform tasks such as frequency, modulation, bandwidth, security functions, and waveform requirements, these functions are performed by software modules or components in the software-defined radio. In this type of radio, analog signals are converted into the digital domain where these functions are performed using digital signal processing Because most of the functions of the radio are controlled by software, software-defined radios may be implemented with relatively standard processor and hardware components, reducing device hardware costs, providing greater flexibility in upgrading the device since new communications waveform modules can be uploaded to the device relatively easily without interchanging new hardware components.

One particular class of software-defined radio, which takes advantage of the above-described advantages features, is the Joint Tactical Radio (JTR). The JTR radio includes relatively standard radio and processing hardware and appropriate waveform software modules to implement the communication waveforms the radio will use. JTR radios use operating system software that conforms with the Software Communications Architecture (SCA) Specification, which is hereby incorporated by reference in its entirety. The SCA is an open architecture framework that specifies how hardware and software components interoperate so that different manufacturers and developers can integrate their respective components into a single device with little difficulty.

Still another class of mobile wireless communications devices that increasingly use software components for communicating with different waveforms or protocols are cellular communication devices. That is, many cellular devices are now designed to operate with more than one of the numerous cellular standards that are used throughout the world, such as the Global System for Mobile Communications (GSM) and Personal Communications Services (PCS), for example. Some have multiprocessor systems with different but interrelated processors.

The Joint Tactical Radio System (JTRS) Software Component Architecture (SCA) defines a set of interfaces and protocols, often based on the Common Object Request Broker Architecture (CORBA), for implementing a Software-defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a COREA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software interfaces and profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.) or and some may be implemented by hardware device providers.

The specifications for the JTRS radio and SCA typically require an interface for command and data (red and black) processing systems and use separate processors and switch fabrics. A radio platform typically includes multiple multi-processor embedded systems, including Field Programmable Gate Arrays (FPGA's) and Digital Signal Processors (DSP's) each as separate systems and processors.

Many of the current radio platforms have a high degree of vertical integration between the hardware and software. This has proven to be a difficulty when upgrading the platforms with different software versions and has been a driving factor behind the definition and realization of this Joint Tactical Radio System (JTRS) Software Communication Architecture (SCA). The compatibility synchronization module solves many of the issues confronted when upgrading separate processors with new software versions.

The SCA standard calls for a certain hardware and software complement. FIG. 7 shows a SCA compliant hardware architecture for a radio indicated by the dashed lines at 120.

Input and Output (I/O) 122, 123 occurs for a dedicated general purpose red processors (GPP's) 124, 126, which are provided on either side of a programmable cryptographic processor (PCP) 128. These GPPs 124, 126 are typically Reduced Instruction Set Computers (RISC) that have sufficient memory and processing resources to handle necessary functions in the SCA architecture allocated to unencrypted data (red) processing and encrypted data (black) processing in one non-limiting example. For military applications, the PCP 128 is typically a government-endorsed module that supports the Cryptographic Equipment Applications that are required by the radio. Closer to the antenna 129 and mapped into the address space of the black GPP 126 are usually programmable hardware such as a Field Programmable Gate Array (FPGA) 130 as a switch fabric and a digital signal processor (DSP) 132 and associated assets that are required to perform application specific modem and protocol functions. The radio RF hardware 134 is provided for the distinct frequency bands, channel bandwidths, and power levels needed by the target applications of the radio. A switch fabric 135 is shown operable on the red side. In this example, the compatibility synchronization module 136 is part of the red GPP and programmed therein as a separate programmable code, but it could be part of other components instead.

FIG. 8 is a block diagram of a SCA compliant software architecture, indicated generally at 150, which can be used as a context for the power management design approach.

The GPPs 124, 126 (FIG. 7) typically have a low level layer of software called a board support package (BSP) 152 that contains the hardware specific drivers and software functions that are required to run a Portable Operating System Interface (POSIX) compliant Real Time Operating System (RTOS) 154 The SCA Application Environment Profile (AEP) dictates the use of CORBA middleware for intra-component communications and the POSIX compliant operating system on the GPP. The middleware includes the CORBA ORB 156 and a hardware abstraction 158 as part of a component power management service definition. SCA application 160 include the core framework operating environment 162. The synchronization module is illustrated generally at 164.

It is also typical to include a low level layer of software in the radio on the GPP that abstracts the platform specific features into a generic set of hardware based functions that can be used by the SCA devices and services. The DSP and FPGA resources of the radio have also recently become the focus of SCA Version 3.0 in a specialized hardware supplement, the disclosure which is hereby incorporated by reference in its entirety. This supplement extends the definition of the SCA AEP to include a definition of the platform environment on the DSP and FPGA resources. The JTRS SCA compliant application software is developed to this set of standards. This is the basis of application portability and the environment for which a set of power management capabilities are defined in accordance with one non-limiting example of the present invention.

There are no established sets of features or Application Programming Interfaces (APIs) in the software environment that can be used to pull this highly layered software architecture together, and, as a result, the kind of vertical coordination between the layers of software that is necessary is defined on a platform-by-platform basis. The facilities that are available on a given platform are highly dependent on the hardware architecture.

It should be understood that the compatibility synchronization module can be located on the red GPP 124 (as illustrated), the black GPP 126, DSP 132, FPGA 130, switch fabric 135 or separate in some other part of the radio circuitry Another view of a software-defined radio is shown in FIG. 9, again showing the different possible locations for the compatibility synchronization module. It is shown as possibly located on the red FPGA 234a, black FPGA 236a, the voice DSP (VDSP) 234b on the red processing side, the DSP 236b on the black processing side, or part of the common components 232.

In accordance with non-limiting examples of the present invention, multiprocessor embedded systems and related methods can be used with the radio software communications architecture as described, including mainframe computers or small computers, including laptops with an added transceiver, such as used by military and civilian applications, or portable wireless communications device as shown in FIG. 10 at 230. The portable wireless communications device is illustrated as a radio that can include a transceiver (as described above) as an internal component and handheld housing 222 with an antenna 224 and control knobs 226. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the transceiver using SCA. An example of a communications device in accordance with non-limiting examples of the present invention is the Falcon® III manpack or tactical radio platform manufactured by Harris Corporation of Melbourne, Fla.

A basic radio circuit 230 such as used in a software-defined radio as described above is shown generally by the block diagram at 230 (FIG. 9) and includes common radio components indicated generally at 232 and red processing components 234 and black processing components 236 operable with a modem 237. Each of the red and black processing components 234, 236 include a field programmable gate array 234a, 236a, digital signal processor 234b, 236b with the red being a Voice DSP (VDSP) and other circuit components 234c, 236c, known to those skilled in the art. A cryptographic module 239 is operable with both red and black side components. The compatibility synchronization module is shown in dashed lines because it can be in different locations and shown at the numerical references 240a-e.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A multiprocessor device, comprising:
a radio circuit having a plurality of device subsystems each having a processor dependent on a respective other processor in another device subsystem for device operation and each processor having at least one independent channel for updating a respective software version within the processor; and
an executable radio software system operable with the radio circuit and conforming to the Software Communications Architecture (SCA) specification and defining an operating environment that allows a waveform application to operate with the radio circuit for transmitting and receiving voice and data;
a compatibility synchronization module having a database storing a table of compatible software versions for each processor and that is updated when a new software version for a processor is created, wherein the table is independent of software images for the software versions and the compatibility synchronization module is operative for verifying if the software version for a processor is compatible with other software versions at other processors and instructing a respective device subsystem to revert back to a compatible software version within a respective processor or prevent any incompatible software updates within the processor.

2. The device according to claim 1, wherein said compatibility synchronization module is located within one of said processors.

3. The device according to claim 1, wherein said compatibility synchronization module is located external to said processors.

4. The device according to claim 1, and further comprising a user interface through which a user interfaces with the device subsystems, wherein said compatibility synchronization module is operative for determining when a new software version within a processor is incompatible, and in response, sending a warning message to the user interface indicating that the software version in the respective processor is incompatible.

5. The device according to claim 4, wherein in response to the warning message, software containing the new software version is disregarded or allowed to update based on user action through the user interface.

6. The device according to claim 1, wherein each processor is operative for reverting back to a previous software version that is compatible upon device shutdown after the compatibility synchronization module determines that a processor has a software version that is incompatible.

7. The device according to claim 1, wherein each processor is operative for reverting back to a previous software version that is compatible upon device shutdown after the synchronization compatibility module determines that the software version within a processor is incompatible and signals the processor to revert.

8. The device according to claim 1, and further comprising a data storage operative with a respective processor in which previous software versions that are compatible are stored to which a respective processor can revert back to when the synchronization compatibility module determines that a software version of a processor is incompatible.

9. A software defined radio, comprising:
a radio circuit having multiple radio subsystems each having a processor that is dependent on a respective other processor in another radio subsystem for radio circuit operation and each processor having at least one independent channel for updating a respective software version within the processor;
an executable radio software system operable with the radio circuit and multiple radio subsystems and conforming to the Software Communications Architecture (SCA) specification and defining an operating environment that allows a waveform application to operate with the radio circuit for transmitting and receiving voice and data; and
a compatibility synchronization module having a database storing a table of compatible software versions for each processor and that is updated when a new software versions for a processor is created, wherein the table is independent of software images for the software versions and the compatibility synchronization module is operative for verifying if the software version for a processor is compatible with other software versions at other processors and instructing a respective radio subsystem to revert back to a compatible software version within a respective processor or prevent any incompatible software updates within a processor.

10. The software defined radio according to claim 9, wherein said compatibility synchronization module is located within one of said processors.

11. The software defined radio according to claim 9, wherein said compatibility synchronization module is located external to said processors.

12. The software defined radio according to claim 9, and further comprising a user interface through which a user interfaces with the radio circuit and executable radio software system, wherein said compatibility synchronization module is operative for determining when a new software version within a processor is incompatible, and in response, sending a warning message to the user interface indicating that the software version in the respective processor is incompatible.

13. The software defined radio according to claim 12, wherein in response to the warning message, software containing the new software version is disregarded or allowed to update based on user action through the user interface.

14. The software defined radio according to claim 9, wherein each processor is operative for reverting back to a previous software version that is compatible upon radio shutdown after the compatibility synchronization module determines that a processor has a software version that is incompatible.

15. The software defined radio according to claim 9, wherein each processor is operative for reverting back to a previous software version that is compatible upon radio shutdown after the synchronization compatibility module determines that the software version within a processor is incompatible.

16. The software defined radio according to claim 9, and further comprising software image files that are updated within each processor and associated with waveform applications.

17. The software defined radio according to claim 9, wherein each processor comprises one of a Field Programmable Gate Array (FPGA) or Digital Signal Processor (DSP).

18. The software defined radio according to claim 9, and further comprising a data storage operative with a respective processor in which previous software versions that are compatible are stored to which a respective processor can revert back to when the synchronization compatibility module determines that a software version of a processor is incompatible.

19. A method of determining compatible software versions within a multiprocessor device, comprising:

updating a software version within at least one processor contained within the multiprocessor device having a plurality of device subsystems each having a processor dependent on a respective processor in another device subsystem for device operation and each processor having at least one independent channel for updating a software version within a processor through which software versions are loaded;

storing a table of compatible software versions for each processor within a database of a compatibility synchronization module, wherein the database is independent of software images of the software versions;

updating the database when new software versions are created;

verifying through the compatibility synchronization module if the software versions within each processor are compatible with each other;

if a software version for a processor is incompatible, instructing a respective processor to which the incompatible software version is to be loaded to revert back to a compatible software version or prevent any incompatible software updates within a processor; and forming the multiprocessor device as a software defined radio having a radio circuit and multiple radio subsystems each having a processor that is dependent on another respective processor in another radio subsystem for radio circuit operation and each processor having at least one independent channel for updating a software version within each processor, and an executable radio software system operable with the radio circuit and conforming to the Software Communications Architecture (SCA) specification and defining an operating environment that allows a waveform application to operate with the radio circuit for transmitting and receiving voice and data.

20. The method according to claim 19, which further comprises locating the compatibility synchronization module within one of said processors or external to one of the processors.

21. The method according to claim 19, which further comprises determining when a new software version within a processor is incompatible, and in response, sending a warning message to a user interface of the multiprocessor device indicating that the software version in the respective processor is incompatible.

22. The method according to claim 21, which further comprises in response to the warning message either updating the software version based on user action through the user interface or disregarding the updating of the software version.

23. The method according to claim 19, which further comprises reverting back to a previous software version that is compatible upon device shutdown after the compatibility synchronization module determines that a processor has a software version that is incompatible.

24. The method according to claim 19, which further comprises reverting back to a previous software version that is compatible upon device shutdown after the synchronization compatibility module determines that the software version within a processor is incompatible.

* * * * *